US007603415B1

United States Patent
McErlean (10) Patent No.: US 7,603,415 B1
(45) Date of Patent: Oct. 13, 2009

(54) CLASSIFICATION OF ELECTRONIC MESSAGES USING A HIERARCHY OF RULE SETS

(75) Inventor: Patrick McErlean, Portglenone (GB)

(73) Assignee: ART Technology Group, Cambridge, MA (US)

( * ) Notice: Subject to any disclaimer, the term of this patent is extended or adjusted under 35 U.S.C. 154(b) by 841 days.

(21) Appl. No.: 09/640,103

(22) Filed: Aug. 15, 2000

(51) Int. Cl.
*G06F 15/16* (2006.01)

(52) U.S. Cl. .......................... 709/206; 709/201; 707/1; 707/2; 707/3; 707/4; 707/5

(58) Field of Classification Search ................. 709/206, 709/201; 707/1–5
See application file for complete search history.

(56) References Cited

U.S. PATENT DOCUMENTS

| | | | |
|---|---|---|---|
| 5,058,182 A * | 10/1991 | Kuan et al. .................. 382/202 |
| 5,459,717 A | 10/1995 | Mullan et al. | |
| 5,488,714 A * | 1/1996 | Skidmore ................... 717/143 |
| 5,574,903 A | 11/1996 | Szymanski et al. | |
| 5,577,202 A | 11/1996 | Padgett | |
| 5,710,894 A * | 1/1998 | Maulsby et al. ............. 715/763 |
| 5,745,893 A * | 4/1998 | Hill et al. ....................... 707/5 |
| 5,751,957 A * | 5/1998 | Hiroya et al. ............... 709/203 |
| 5,765,033 A | 6/1998 | Miloslavsky | |
| 5,832,470 A * | 11/1998 | Morita et al. .................. 707/1 |
| 5,903,858 A * | 5/1999 | Saraki ........................... 704/4 |
| 5,928,325 A | 7/1999 | Shaughnessy et al. | |
| 5,978,836 A | 11/1999 | Ouchi | |
| 5,987,171 A * | 11/1999 | Wang ......................... 382/173 |
| 6,021,427 A | 2/2000 | Spagna et al. | |
| 6,026,396 A | 2/2000 | Hall | |
| 6,044,395 A | 3/2000 | Costales et al. | |
| 6,058,435 A | 5/2000 | Sassin et al. | |
| 6,076,101 A | 6/2000 | Kamakura et al. | |
| 6,085,100 A | 7/2000 | Tarnanen | |
| 6,115,497 A * | 9/2000 | Vaezi et al. .................. 382/174 |
| 6,128,646 A | 10/2000 | Miloslavsky | |
| 6,161,130 A * | 12/2000 | Horvitz et al. .............. 709/206 |
| 6,167,402 A | 12/2000 | Yeager | |
| 6,182,059 B1 | 1/2001 | Angotti et al. | |
| 6,216,691 B1 | 4/2001 | Kenyon et al. | |
| 6,249,807 B1 | 6/2001 | Shaw et al. | |
| 6,338,081 B1 | 1/2002 | Furusawa et al. | |
| 6,356,633 B1 | 3/2002 | Armstrong | |
| 6,385,619 B1 * | 5/2002 | Eichstaedt et al. ......... 707/104.1 |
| 6,389,132 B1 | 5/2002 | Price | |
| 6,417,930 B2 * | 7/2002 | Mori .......................... 358/1.15 |
| 6,424,997 B1 * | 7/2002 | Buskirk et al. .............. 709/206 |

(Continued)

*Primary Examiner*—Alina N. Boutah
(74) *Attorney, Agent, or Firm*—RatnerPrestia (57) ABSTRACT

An electronic message processing system includes a classification module for classifying electronic messages, such as e-mails and SMS messages, into one or more categories according to their content. In a preferred embodiment, a text analyzer is used to apply a sequence of one or more rule sets to the content of each message. The rule sets to be applied and their order in the sequence is determined by a hierarchical structure. The use of the hierarchical structure reduces the number of rules which must be applied to a given message. Arranging the rules in sets facilitates administration and maintenance of the rules. A further aspect of the invention involves the instantiation of multiple instances of the text analyzer, one instance for each rule set. This allows an appropriate lexical analysis tool, such as a dictionary in an appropriate language, to be used in conjunction with each rule set.

14 Claims, 5 Drawing Sheets

U.S. PATENT DOCUMENTS

| | | |
|---|---|---|
| 6,442,592 B1 | 8/2002 | Alumbaugh et al. |
| 6,477,551 B1 * | 11/2002 | Johnson et al. ............ 709/206 |
| 6,493,695 B1 | 12/2002 | Pickering et al. |
| 6,493,703 B1 * | 12/2002 | Knight et al. ................ 707/3 |
| 6,515,681 B1 | 2/2003 | Knight |
| 6,519,617 B1 | 2/2003 | Wanderski et al. |
| 6,571,225 B1 | 5/2003 | Oles et al. |
| 6,571,234 B1 | 5/2003 | Knight et al. |
| 6,606,649 B1 | 8/2003 | Schwitters et al. |
| 6,629,130 B2 | 9/2003 | Mertama et al. |
| 6,654,735 B1 | 11/2003 | Eichstaedt et al. |
| 6,691,151 B1 | 2/2004 | Cheyer et al. |
| 6,760,753 B1 * | 7/2004 | Ohgushi et al. ............. 709/206 |
| 6,769,014 B1 | 7/2004 | Chang et al. |
| 6,801,936 B1 | 10/2004 | Diwan |
| 6,826,576 B2 * | 11/2004 | Lulich et al. ................ 707/102 |
| 2002/0107926 A1 * | 8/2002 | Lee ............................ 709/206 |
| 2003/0105826 A1 * | 6/2003 | Mayraz ...................... 709/206 |

* cited by examiner

CLASSIFICATION OF ELECTRONIC MESSAGES USING A HIERARCHY OF RULE SETS

FIELD OF THE INVENTION

The present invention relates to electronic message processing. The invention relates particularly, but not exclusively, to the categorization of electronic messages.

BACKGROUND TO THE INVENTION

Many organizations are now equipped to receive messages, including orders and enquiries, by electronic means. Typically, such electronic messages take the form of text-based messages, for example e-mails, delivered by a global computer network, for example the Internet, or by a telecommunications network, for example a mobile telephone network. Each message must be processed and dealt with appropriately. In many cases, the volume of received electronic messages is relatively high and it is considered inefficient to process each message manually.

For this reason, it is known for electronic message processing systems, typically in the form of a computer system, to employ a text analyzer, such as IBM's Mail Analyzer, to analyze the content of electronic messages in order to classify, or categorize, each message according to its content. Once a message has been categorized, the processing system sends it on to a human operator who has the skills necessary to deal with messages falling within the relevant category(s). Alternatively, the computer system itself may be able to deal with messages falling within certain category(s).

Typically, a text analyzer examines the text of each message in turn in search of one or more alphanumeric text string, for example a word or sequence of words, which may be used to identify the purpose or nature of the message under examination. It is known for the text analyzer to operate in association with a rule engine to apply a set of rules to the message in order to determine how to categorize the current message.

By way of simplistic example, consider a banking organization which has a message processing system arranged to receive electronic messages in three different categories, namely: balance enquiry; request for funds transfer; and interest rate enquiry. In order to categorize each received message, a text analyzer in association with a rule engine applies a set of four rules to each message in turn. The first rule stipulates that if the text string "balance" appears in the message, then the message falls in the balance enquiry category. The second rule stipulates that if the text strings "funds" and "transfer" appear in the message, then the message falls in the funds transfer category. The third rule stipulates that if the message contains the text string "interest rate", then the message should be categorized as an interest rate enquiry. The fourth rule stipulates that if none of the previous rules are satisfied, then the message is deemed unclassified. Clearly, a message may fall within more than one category.

The message processing system may be arranged to distribute all balance enquiries, fund transfers and unclassified messages to an appropriate human operator, while being arranged to send out interest rate information itself.

Such systems are suited to processing relatively small volumes of messages falling over a relatively small number of categories but exhibit serious shortcomings when dealing with large volumes of messages and a large number of categories.

It is increasingly common for organizations to receive up to hundreds of thousands of electronic messages each day, each message requiring classification into one or more of typically hundreds of different categories. To perform message categorization, a text analyzer would typically apply a set of several hundred rules to each message, the final classification of each message being derived from a combination of the results the application of all of the rules to that message. Conventionally, a flat rule structure is employed meaning that each rule is given equal weight and is applied in sequence to each message, one message at a time. This requires a large amount of computer processing power that can lead to unacceptable delays in dealing with incoming messages.

Further, for a complex taxonomy, the precision (i.e. the degree to which messages are categorized correctly) and recall (i.e. the degree to which a complete set of message categorizations are produced) are difficult to maintain at a high level.

It is also problematic to administer a single set of rules over a complex organization having a number of different divisions or sub-organizations since one or more categories may need to be defined or characterized differently to account for differences in culture, regulation, market segmentation, brand specificity, or the like. Similar problems arise where more than one organization shares a single message processing system (and therefore a single set of rules) through, for example, an Application Service Provider (ASP). There is a potential for conflict over the rules in that the rules for one organization, or sub-organization, may affect the application of the rules of another organization, or sub-organization, and so lead to inappropriate categorizations.

This problem is compounded when the different organizations, or sub-organizations, need to be able to receive messages in different languages. A particular problem that multiple languages causes concerns the performance of lexical analysis (sometimes known as word-stemming) on the message under examination. Lexical analysis is desirable since it enables the text analyser to recognize different forms of words, such as plurals and participles, and so helps messages to be categorized correctly. In general, Lexical analysis is typically performed using a dictionary but a conventional text analyzer can only operate with one dictionary at a time. If, for example, a text analyzer is initialized with an English dictionary, then any messages received in any other language cannot benefit from lexical analysis.

SUMMARY OF THE INVENTION

Accordingly, the present invention provides an electronic message processing system arranged to receive electronic messages, the system comprising: means for storing a plurality of rules; a text analyzer; a rule engine associated with text analyzer and with the rule storage means, the text analyzer and the rule engine being co-operable to apply one or more rules to the content of a received electronic message and to generate one or more results based on the application of the or each rule; a classification module co-operable with the text analyzer and the rule engine and arranged to classify the electronic message into one or more message categories based on said one or more results, wherein the rules are arranged into a plurality of rule sets, the classification module being arranged to cause the text analyzer in association with the rule engine to apply one or more rule sets to the message content in accordance with a hierarchical structure whereby the or each result generated by application of one rule set to the message content determines the next rule set, or rule sets, to be applied.

Arranging rules into multiple rule sets is advantageous in that each rule set can be maintained and administered independently i.e. without interfering with other rule sets. Thus, by allocating a respective rule set, or sets, to respective organizations or sub-organizations, the likelihood of conflict amongst organizations/sub-organizations is greatly reduced. Further, as a result of using the hierarchical structure, only those rule sets that are relevant to the message at hand are applied by the rule set. This greatly reduces the processing power required to classify a message.

Preferably, the text analyzer includes the rule engine. More preferably, the classification module is arranged to instantiate a respective instance of the text analyzer for each rule set, each text analyzer instance being arranged to apply its respective rule set to the message content. Further preferably, each text analyzer instance is associated with a respective lexical analysis tool, such as a dictionary.

This allows each message to be analyzed using a dictionary of an appropriate language and so the benefits of lexical analysis are not lost on any message.

Preferably, the rule storage means comprises a plurality of rule files, each rule file containing a respective rule set. This facilitates independent administration and maintenance of each rule set.

The invention also provides a classification module for use in an electronic message processing system, as claimed in claim 8.

The invention further provides a method of classifying an electronic message as claimed in claim 9.

The invention also provides an electronic mail (e-mail) processing system comprising the electronic message processing system of the invention. The invention further provides an SMS message processing system comprising the electronic message processing system of the invention.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
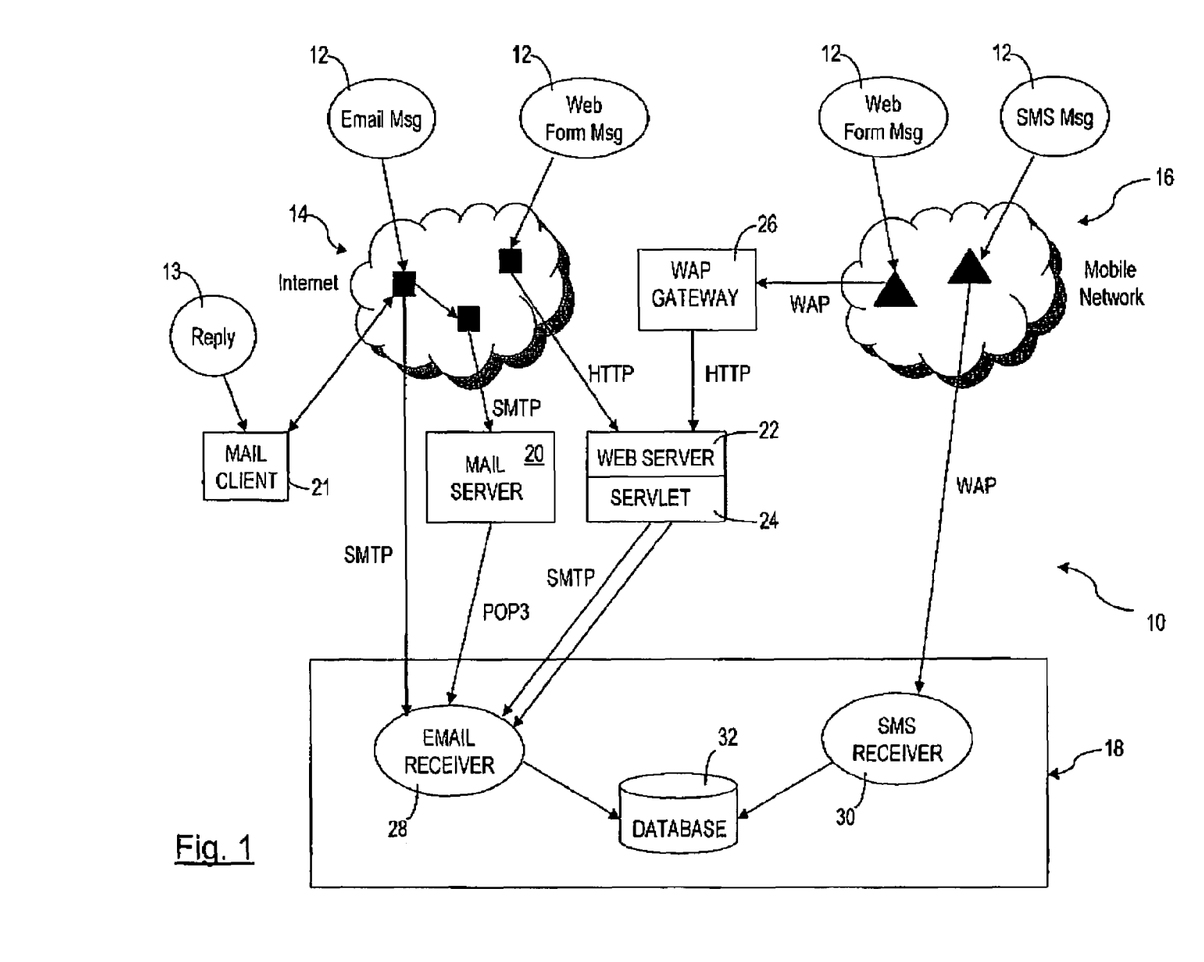
FIG. 1 is a schematic view of a communications network including a electronic message processing system.

With reference to FIG. 1 of the drawings, there is shown, generally indicated at 10, a communications network for the transmission of electronic messages 12. The network 10 includes a global computer network 14, such as the Internet, and a mobile telephone network 16 but, in general, may include any computer network and/or telecommunications network, including WAN, LAN or MAN networks. The electronic messages 12 typically take the form of, for example, e-mails, Web-page forms, SMS (Short Message Service) text messages as commonly used by mobile telephones or the like. It will be understood that the present invention is not limited for use with any particular such type or types of electronic messages.

The electronic messages 12 are transmitted across the communications network 10 in conventional manner using, for example, a mail server 20, Web server 22, servlet 24 and/or WAP (Wireless Application Protocol) gateway 26, as appropriate, and using conventional transmission protocols such as, WAP, HTTP (Hyper Text Transfer Protocol), SMTP (Simple Mail Transfer Protocol), POP (Post Office Protocol), or other suitable protocol. It will be understood that the invention is not limited to use with any particular transmission means or protocols.

The electronic messages 12 are received by a message processing system 18 which may reside, for example, on an organization's computer system (not shown) or an ASP's computer system (not shown). The message processing system 18 includes means for receiving electronic messages in conventional manner which, in the example of FIG. 1, includes an e-mail receiving module 28, an SMS receiving module 30 and a database 32 for storing received messages 12.

In the example illustrated in FIG. 1, the e-mail receiver 28 is arranged to receive e-mails in two ways. The first is directly from an ISP (Internet Service Provider) using SMTP, the second is via the mail server 20 using POP3. The e-mail receiver 28 is further arranged to receive Web-page form messages through the web server 22. Web-page form messages may be considered as structured e-mails which call the servlet 24 in the web server 22 which in turn converts the Web-page from content into an e-mail which is subsequently sent to the e-mail receiver 28 using SMTP.

Web-page forms from the mobile network 16 are transmitted using a WAP protocol stack to the WAP gateway 26. The WAP gateway 26 converts the Web-page form into an HTTP request, which is then processed by the web server 22 and servlet 24 as described above. SMS messaging from the mobile network 16 is conveniently transmitted using WAP to the SMS receiver 30.

Thus, the e-mail receiver 28 and the SMS receiver 30 are arranged in conventional manner to support the appropriate transmission protocols which, in the example of FIG. 1, are SMTP and POP3 for the e-mail receiver 28, and WAP for the SMS receiver.

As described below with reference to FIG. 2, the e-mail server is also configured to receive reply messages 13 via a mail client 21 coupled to the global computer network 14.

The communications network 10 of FIG. 1 is given by way of example only to provide a typical context for the invention and is not limiting to the invention.

Figure 2:
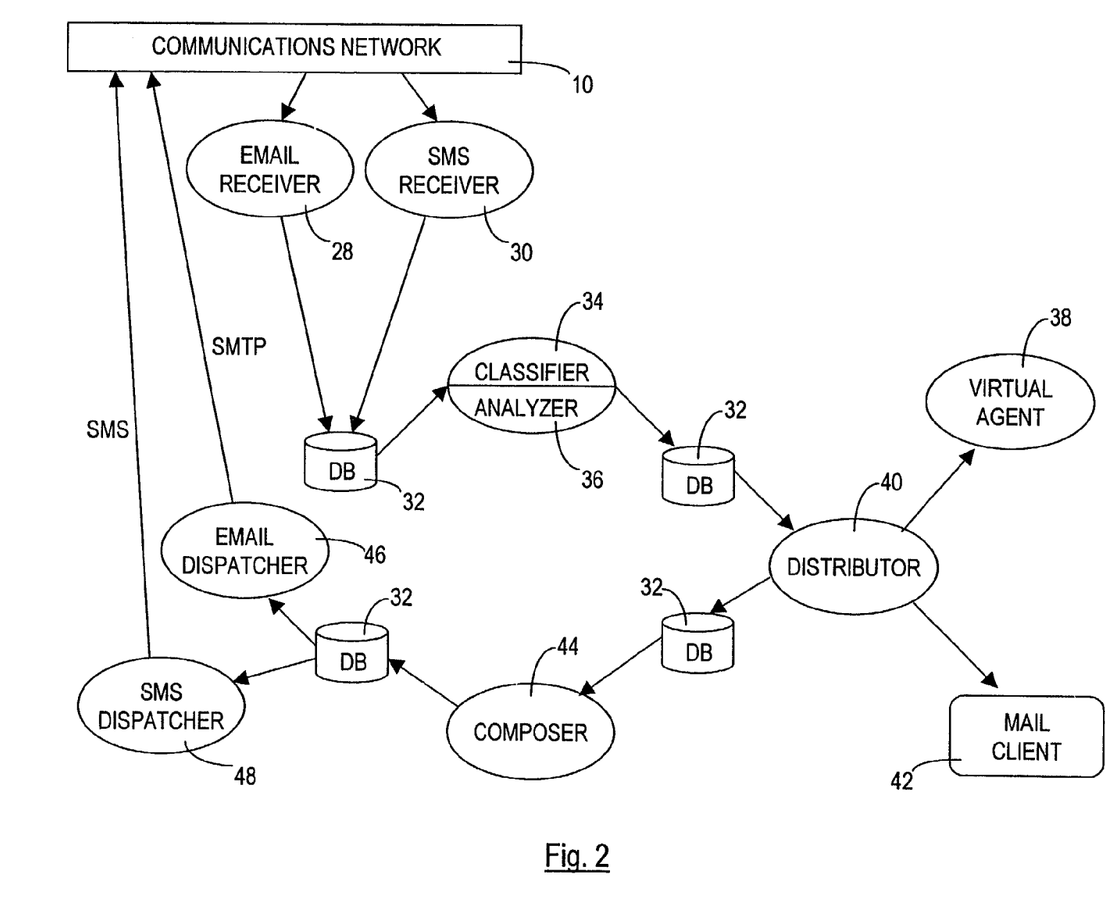
FIG. 2 is a more detailed schematic view of the electronic message processing system of FIG. 1.

Referring now to FIG. 2, the message processing system 18 is shown in more detail. Electronic messages 12 received by the e-mail receiver 28 and SMS receiver 30 are stored in database 32. A classification module 34, or classifier, retrieves each message 12 from the database 32 in turn. The primary function of the classifier 34 is to classify, or categorize, each message 12 into one or more categories depending on the content of the message 12. To this end, the classifier 34 is associated with, or includes, a text analyzer 36, for example the IBM Mail Analyzer and is further associated with, or includes, a rule engine. This classification process is described in more detail with reference to FIGS. 3, 4 and 5.

Once classified, each message is returned to the database 32 by the classifier 34 together with the determined classification information and, preferably, with information as to where the message should be routed in view of its classification. For example, messages 12 falling within certain categories may require to be dealt with by a human operator (not shown) with particular skills, while messages 12 falling within other categories may be dealt with automatically by a virtual agent 38.

A distributor module 40, or distributor, retrieves the categorized messages and sends them either to the virtual agent 38 or a mail client 42, according to the respective categorization and/or routing information. The virtual agent 38 includes one or more software routines which automatically generate an appropriate response to a message 12 according to its categorization information. The mail client 42 provides the message 12 to a human operator, or agent, who then prepares an appropriate response. A message 12 may, depending on the number and nature of categories into which it falls, be passed by the distributor 40 amongst a plurality of human and/or virtual agents in order that a complete response may be prepared. Once a final response is prepared, the distributor 40 marks the response as complete and stores it in the database 32.

A composing module 44, or composer, retrieves responses from the database 32 that are marked as complete and composes a respective response message (not shown) for reply to the originator (not shown) of the respective received message 12. The composer 44 typically fulfils any attachment requirements as well as adding the appropriate Internet, or other, protocol information. Each composed response message is then returned to the database 32.

An e-mail dispatch module 46, or dispatcher, retrieves from the database 32 the composed response messages which are destined to be transmitted by e-mail and conveniently dispatches them to an ISP (not shown) using SMTP. An SMS dispatch module 48, or dispatcher, retrieves from the database 32 the composed response messages which are destined to be transmitted as SMS messages and dispatches them to the mobile network 16 using SMS protocol.

Conveniently, the modules of FIG. 2 take the form of CORBA (Common Object Request Broker Architecture) modules, or servers written, for example, in the Java programming language. Each module may reside on a single computer or may be distributed across a computer system, as is convenient. The e-mail receiver 28, SMS receiver 30, virtual agent 38, distributor 40, mail client 42, composer 44, e-mail dispatcher 46 and SMS dispatcher 48 are conveniently conventional in configuration and operation and are not limiting to the present invention.

The present invention is concerned primarily with the operation of the classifier 34 in association with the text analyzer 36 and rule engine. Some electronic messages 12 are structured i.e. they are composed in accordance with a specific known format, and may be inherently classified into one or more categories in cases where their purpose is dictated by the structure. For example, a particular Web-page form (not shown) is typically provided on the Web site of an organization in order for their customers to make a specific enquiry. In the example of a simple banking organization, one Web-page form may be used to make a balance enquiry while a different Web-page form may be used to make a request for a funds transfer. When the banking organization receives an electronic message 12 emanating from such a Web-page form, the nature or purpose of the message 12 is inherently known by virtue of the Web-page form used. In other cases, however, received electronic messages 12 are unstructured and their nature or purpose is not known inherently. The function of the classifier 34, in association with the text analyser 36, is to determine the purpose or nature of an electronic message 12 by examining its content and subsequently classifying the message 12 into one or more categories which reflect the determined purpose or nature.

The text analyzer 36 is preferably of the type which includes a rule engine (not shown). The IBM Mail Analyzer is an example of such a text analyzer 36. The text analyzer 36 is therefore associated with a set of rules which it uses, in conjunction with the rule engine, to evaluate the content of an electronic message 12. In an alternative embodiment, the text analyzer and the rule engine may be separate modules arranged for co-operation with one another. Typically, a rule comprises a conditional statement whereby an assertion is made if a condition is met. The condition is typically the presence in the message content of a particular alphanumeric text string or character string. The assertion is typically that the message 12 belongs, or may belong, to a particular category, or categories. Thus, to evaluate a rule, the text analyzer examines the message content, using conventional text analysis methods, searching for the presence of the particular string, or strings of text upon which said rule is conditional. In the simplistic banking example, one rule may stipulate that if the text string "balance" appears in the message 12, then the message 12 falls in the balance enquiry category. As second rule may stipulate that if the text strings "funds" and "transfer" appear in the message 12, then the message 12 falls in the funds transfer category, and so on. In practice, there may be hundreds of rules in a set and more than one rule may be required to be met before the text analyzer 36 determines that a message 12 falls within a particular category.

The rules themselves may be determined manually but are conveniently generated automatically using a training tool (not shown), such as the IBM Mail Analyzer Training Tool. The training tool is provided by an operator (not shown) with a batch of sample messages which are known to fall within a particular category. The training tool examines each sample message in the batch looking for characterizing alphanumeric text strings such as a word or group of words. The training tool uses these characterizing text strings to generate one or more rules which may subsequently be used by the text analyzer 36 when evaluating each real message 12. The process is repeated for each category used by the, or each, organization, or sub-organization, which uses the same message processing system 18. The number of categories, and therefore the number of rules, depends on the organization(s) but may, for example, number several hundred.

Conventionally, the classifier 34 is associated with only one instance of a text analyzer 36 and the single text analyzer 36 instance is associated with only one rule set and, optionally, one dictionary (to allow the text analyzer 36 to perform a lexical analysis, or 'word-stemming'). Hence, all of the rules generated for all of the categories are conventionally stored in a single rules file (not shown in FIG. 2) which is associated with the text analyzer 36 upon its initialization. In use, each message 12 is evaluated against each rule in sequence (flat rule structure). The problems with operating a single rules file and a flat rule structure where there are a relatively large number of categories and rules and/or more than one organization, or sub-organization, to cater for, are outlined above.

Figure 3:
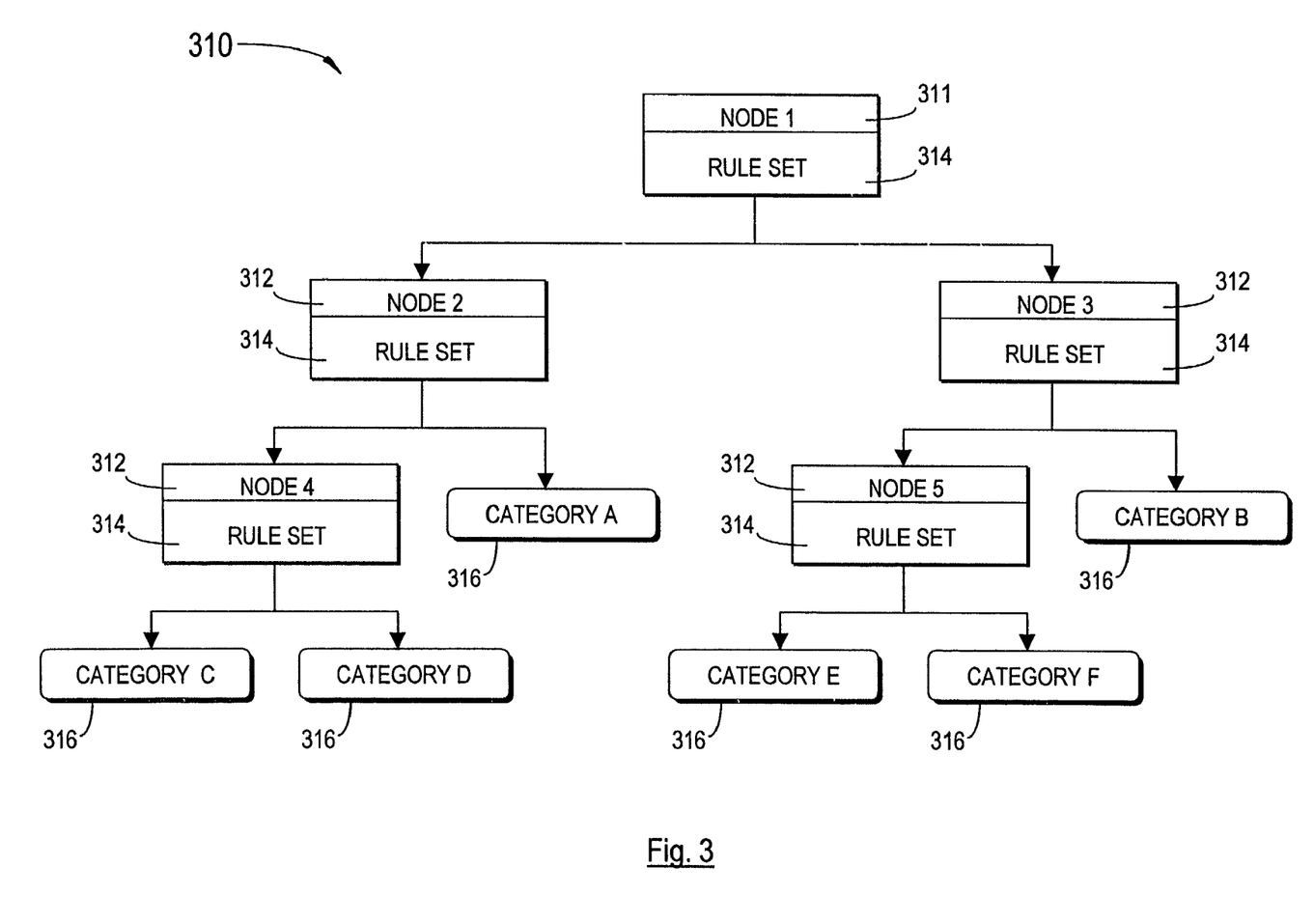
FIG. 3 is a schematic view of a hierarchical structure for use, in accordance with the present invention, in the classification of electronic messages.

Referring now to FIG. 3, in accordance with the present invention a hierarchy, or hierarchical structure 310, is employed in the classification, or categorization, of electronic messages 12. The hierarchical structure 310, which may also be referred to as a decision tree, comprises a plurality of nodes arranged in a hierarchy. The nodes include a root node 311, one or more branch nodes 312 and one or more leaf nodes 316. The root node 311 and the or each branch node 312 is associated with a respective set of one or more rules 314. A message 12 to be classified is first subject to the rule set 314 associated with the root node 311 which, in FIG. 3, is NODE 1. The result of the NODE 1 rule set evaluation determines under which branch node 312 the message 12 is subsequently evaluated which, in the example hierarchy of FIG. 3, is either NODE 2 or NODE 3. Evaluation of the rule set 314 associated with NODE 2 determines whether the message 12 should subsequently be evaluated under a further branch node 312 (NODE 4) and/or classified as category A at a leaf node 316. Similarly, evaluation of the rule set 314 associated with NODE 3 determines whether the message 12 should subsequently be evaluated under NODE 5 and/or classified as category B. A leaf node 316 terminates a branch of the hierarchy an corresponds to a respective classification category. In general, the rule set 314 of a given root or branch node 311, 312 determines, when applied to a message 12, under which further branch node 312, and therefore which further rule set, the message 12 is subsequently to be evaluated and/or at which leaf node 316 the message 12 is classified. Each message is effectively routed through the hierarchy until it has been classified into one or more categories which, in the example of FIG. 3, may be one or more of categories A to F.

The hierarchy in FIG. 3 is given by way of example only. The actual shape and size of the hierarchy (i.e. the number and type of nodes and their inter-dependencies) will depend on the number and nature of the possible categories and therefore on the needs of the organization(s) who use the message processing system. In general, one or more branch nodes 312 may hang from, or depend on, a root node 311 or preceding branch node 312, and one or more leaf nodes 316 may hang from, or depend on, a root node 311 or preceding branch node 312. A message 12 falling within more than one category may be routed through the hierarchy along more than one branch to arrive at the relevant leaf node(s) 316.

The electronic message processing system of the invention includes a classification module which stores, or has access to, the hierarchical structure to be implemented. The classification module is arranged to associate each of the branch nodes and the root node with a respective rule set and to associate each leaf node with one or more respective message category, and to cause the text analyzer, to apply (by means of its rule engine), to the content of a message, firstly the rule set associated with said root node and then to determine, depending on the or each result generated by the application of said rule set, the next node in the path or route through the hierarchy i.e. whether the next node is a branch node and, if so, which branch node, or a leaf node. If a branch node is encountered, then the classification module causes the text analyzer to apply the rule set associated with that branch node. The process repeats until the hierarchical structure determines that the next node is a leaf node, in which case classification of the message is complete i.e. an appropriate category for the message has been found. As is described in more detail with reference to FIG. 5, the classification module may navigate along more than one route through the hierarchical structure 310. In FIG. 3, for example application of the rule set associated with branch NODE 2 may generate a result set of, say, two results. One result may indicate that the message falls into category A. The other result may indicate that the message content should next be evaluated using the rule set associated with NODE 4. The classification module continues to apply rule sets to the message content until each path through the hierarchy reaches a leaf node 316—this indicates that classification, or categorization, of the message is complete. Thus, in general, the classification module is arranged to cause the text analyzer to apply a one or more rule sets to the message content in accordance with a hierarchical structure whereby the or each result generated by the rule engine upon application of one rule set to the message content determines the next rule set, or sets, to be applied. Effectively, the rules are arranged into rule sets, each set having one or more rules, and the rule sets are arranged according to a hierarchical structure which is implemented, by the classification module, as a decision tree such that the next node to be implemented depends on the outcome of the application of the rule set of the previous node. The rules may be stored in the system by any convenient means, for example in a computer file, in memory or in a database. Preferably, each rule set is stored in a respective computer file since this facilitates the administration and maintenance of each rule set independently of the others. Similarly, the data describing the heirarchical structure can be stored by any conventional means, such as a computer file.

Figure 4:
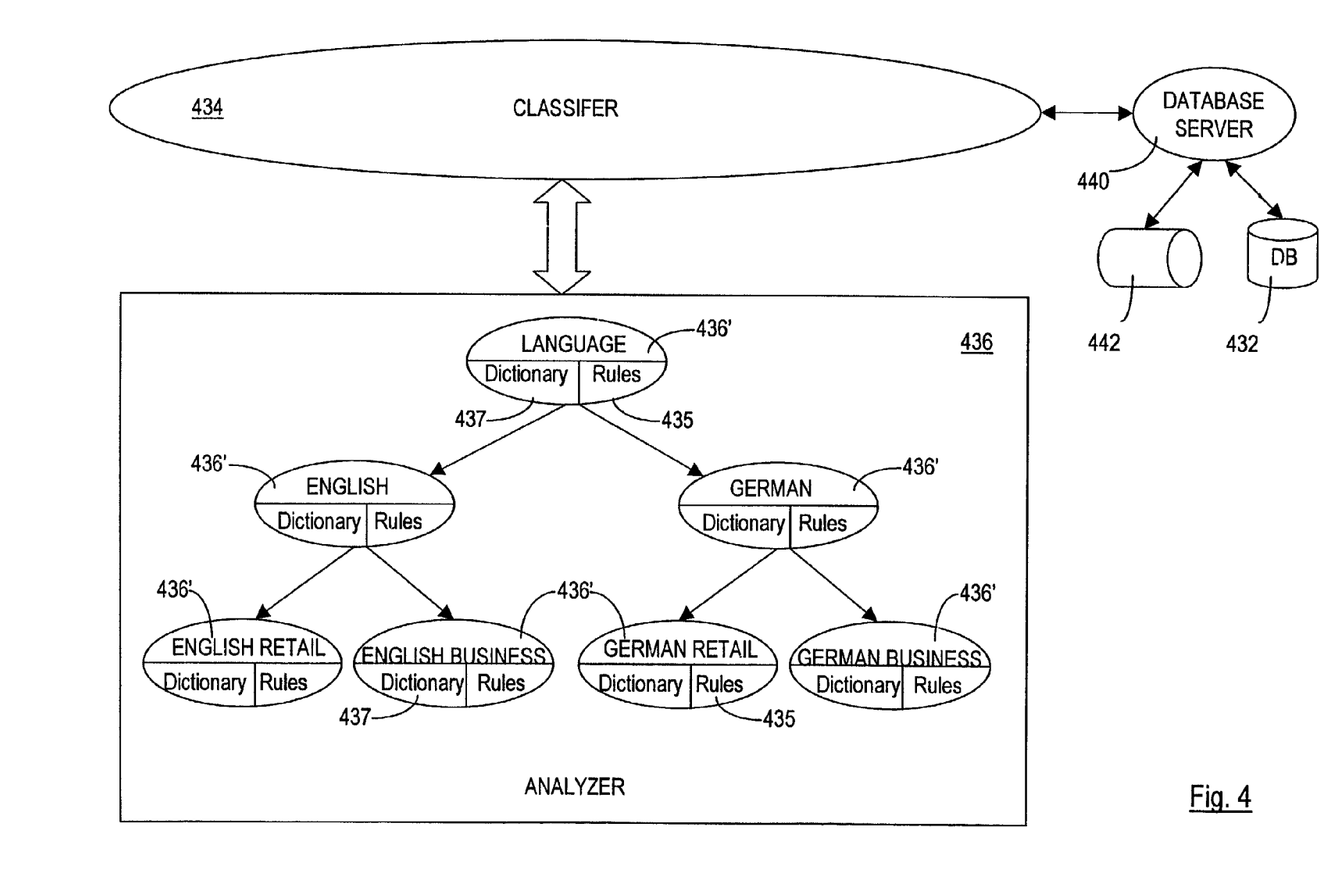
FIG. 4 is a schematic view of a classification module and multiple instances of a text analyzing module arranged in accordance with the present invention.
Figure 5:
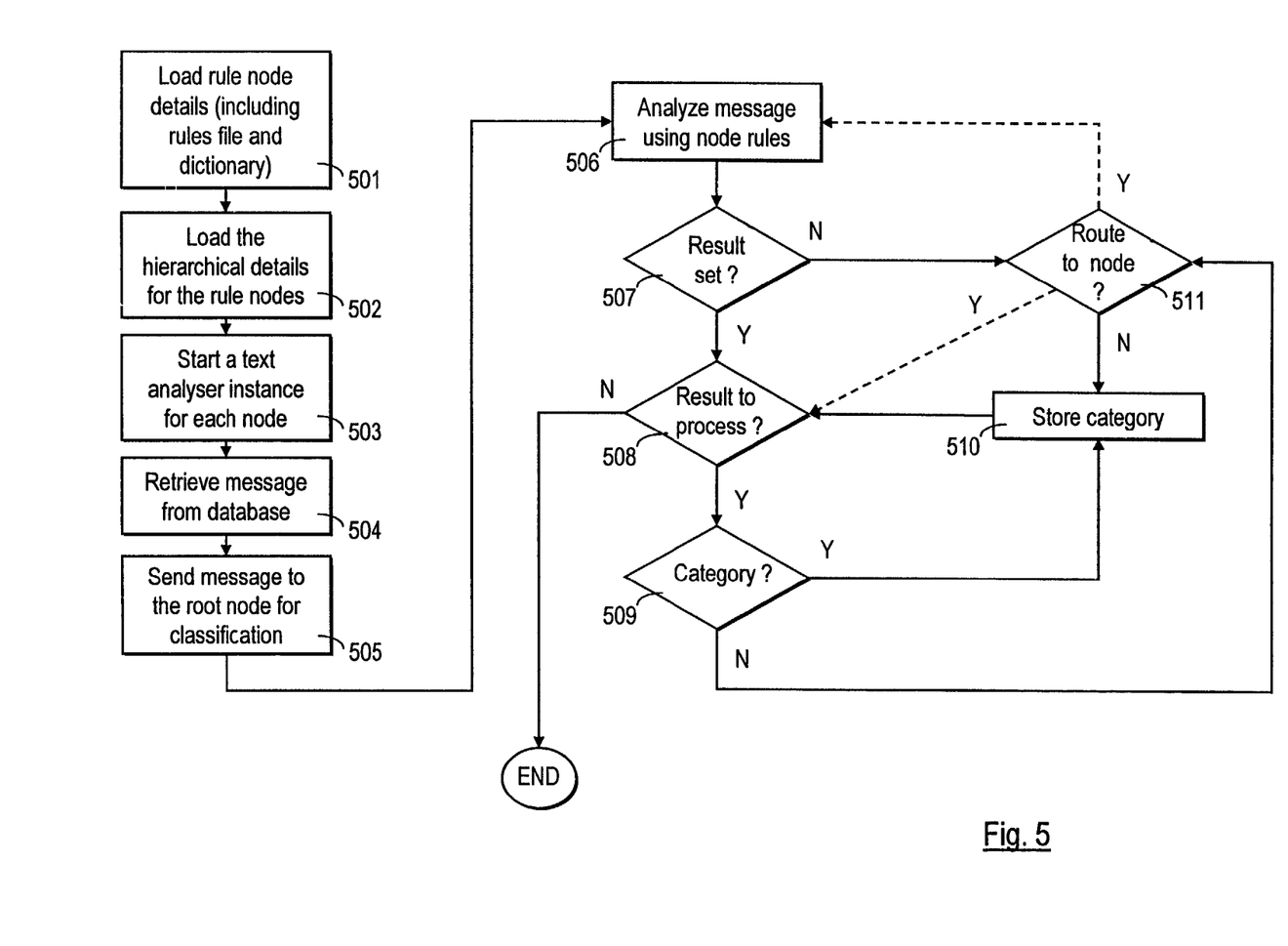
FIG. 5 is a flow diagram illustrating the operation of the classification module of FIG. 4.

An example implementation of the hierarchical structure 310 of FIG. 3 is now described with reference to FIGS. 4 and 5. In FIG. 4, there is shown a classification module 434, or classifier, in association with a text analyzer 436 (which includes a rule engine (not shown)) for use in an electronic message processing system according to the present invention. The classifier 434 is co-operable with a plurality of instances 436' of the text analyzer 436, each instance associated with a respective rule set 435 and, preferably, a respective dictionary 437, or other lexical analysis tool. A respective instance 436' of the text analyzer 436 is provided for each root or branch node 311, 312 of the hierarchical rule structure 310 being implemented (and therefore for each rule set). The respective rule set for each instance 436' of the text analyzer 436 therefore corresponds with the rule set for the respective root or branch node 311, 312.

The classifier 434 conveniently, but not necessarily, takes the form of a CORBA server, preferably written in Java, or similar programming language. The text analyzer 36 is conveniently, but not necessarily, available to the classifier 434 as part of a DLL (Dynamic Link Library), or a UNIX SO (shared object) as appropriate, and arranged to allow multiple instantiation.

The classifier 434 is arranged to retrieve electronic messages 12 from a database 432. Conveniently, communication between the classifier 434 and the database 432 is effected by a database server 440 in conventional manner. The database server 440 also provides the classifier 434 with access to a file system 442 which conveniently stores the rule sets, the hierarchical rule structure to be implemented and, if applicable, one or more dictionaries (or other lexical analysis tool).

The operation of the classifier 434 is now described with reference to FIG. 5. At module 501, the classifier 434 retrieves from the database 432 details of nodes in the hierarchical structure to be implemented, together with the respective rule sets for each node and, if lexical analysis is desired, a respective dictionary, or other lexical analysis tool. At module 502, the classifier 434 retrieves from the database 432 details of the inter-dependencies of the nodes in the hierarchical structure. All of the information retrieved at modules 501 and 502 is conveniently stored in memory by the classifier 434.

At module 503, the classifier 434 instantiates a respective instance 436' of the text analyzer 436 for each root and branch node 311, 312 and associates with each instance 436' the respective corresponding rule set and, if applicable, dictionary.

At module 504, the classifier 434 retrieves from the database 432 a message 12 to be classified. At module 505, the retrieved message is provided to the instance 436' of the text analyzer 436 which corresponds to the root node 311 of the hierarchical rule structure. The contents of message 12 are evaluated by said instance 436' of the text analyzer 436 and a result is returned to the classifier 434.

At module 506, the classifier 434 causes the text analyzer, in conjunction with its rule engine, to analyze the message at hand according to the rule set associated with the current node (initially the root node). There are two possible outcomes from the analysis. The first is that the text analyzer 436 produces a set of one or more results which have been generated by application of the rule set to the message. In the present example, the or each result may indicate that the message either belongs to a particular category, or that the message should next be analyzed by the rule set of a further branch node 312. It will be appreciated that, in alternative embodiments, a result may have other indications depending on the system within which the text analyzer is intended to operate. Since the text analyzer 436 may produce multiple results, it follows that the text analyzer 436 may determine that the message belongs to one or more categories and/or should be analyzed in accordance with one or more further branch nodes 312. With reference to FIG. 3, this effectively means that a message may be routed through the hierarchical structure 310 along more than one path. Each path corresponds with a respective sequence of rule sets under which the message is evaluated. The second possible outcome of the analysis is that the text analyzer 436 does not produce any results i.e. the result set is a null set. In this case the classifier 434 implements a default option as described below.

Module 507 tests whether or not the analysis at module 506 has produced any results. If one or more results have been produced then the classifier 434 proceeds to module 508 where it tests whether or not there is a result to process (which there will always be when the classifier 434 reaches module 508 from module 507). When module 508 determines that there is a result to be processed, the classifier 434 proceeds to module 509 where it tests whether or not the result indicates that the message belongs to a particular category i.e. whether or not a leaf node 316 of the hierarchical structure 310 being implemented has been reached. If so, then the classifier 434 proceeds to module 510 where it stores a record of the category indicated by the result. The category may be stored in any conventional manner—conveniently in a file for association with the message being analyzed. The classifier 434 then returns to module 508 to determine whether or not there are any further results to be processed.

Should module 509 determine that the result is not indicative of a message category, the classifier 434 proceeds to module 511 where it tests whether or not the result indicated that the message should be analyzed in accordance with a further branch node 312. If so, then the classifier 434 routes the message to the branch node 312 indicated by the result, i.e. it passes the message to the text analyzer instance 436' associated with the indicated branch node 312, and returns to module 506 so that modules 506 to 511 are repeated, only this time by a different text analyzer instance using a different rule set.

Also from module 511, the classifier 434 returns to module 508 to determine whether or not there are any further results to be processed.

Thus, the operation of the classifier 434 is recursive in nature and may, for example, be performing modules 508 to 511 using the text analyzer instance and rule set associated with a first node while also performing modules 506 to 511 using the text analyzer and rule set associated with a second node, and so on, all on the same message. The dashed lines in FIG. 5 are used to indicate where recursion may occur. The recursive nature of the classifier 434 arises because of the possibility of navigation through the hierarchical structure by more than one route.

If, at module 507, it is found that no results are produced by the text analyzer, then advantageously a default procedure is followed. In the preferred embodiment, the default procedure is to assign the message to a pre-determined default node or category. In the case of a default node being desired, the classifier 434, upon return to module 511 from module 507, proceeds to module 506 and so routing the message to the text analyzer associated with the default node. If a default category is desired, then at module 511 the classifier 434 proceeds to module 510 and stores the default category.

Similarly, should the classifier 434 reach module 511 from module 509 and determine that the correct result does not match any valid nodes, then the default procedure is followed.

The classifier 434 terminates its processing of the message when, at module 508, it determines that there are not further results to process.

The classifier 434 returns classified messages to the database 432, together with the determined category information and, preferably, information on how the message should be routed in view of its classification, for distribution by the distributor 40.

The classifier 434 need not necessarily launch multiple instances of the text analyzer 436 simultaneously (module 503). In an alternative embodiment, the classifier 434 may be arranged to instantiate an instance 436' of the text analyzer 434 corresponding to a particular node only when it is determined by the rules evaluation under a preceding node that evaluation under said particular node is required.

The advantages of the invention can readily be appreciated by reference to the example of FIG. 4. In this example it is assumed that a banking organisation has two sub-organizations, one in the USA and one in Germany, and can therefore receive electronic messages 12 in either the English language or the German language. It is further assumed that each sub-organization has two divisions namely, business banking and retail banking. Each division has a list of categories in which to place incoming electronic messages 12, some of which they may have in common.

The text analyzer instance 436' which corresponds to the root node 311 is designated LANGUAGE and is associated with its own set of rules 435 and a dictionary. The purpose of the root node 311 in this example is to determine whether the message 12 to be classified is in English or in German. To do this, the rule set 435 associated with the LANGUAGE instance 436' is arranged to search for words (sometimes referred to as stop-words) in the message 12 which can readily be used to identify a language. In this case, "der", "das", "the" or "it" may be suitable stop-words to search for.

Two further instances 436' of the text analyzer 436 are designated ENGLISH and GERMAN respectively. The ENGLISH instance corresponds to a branch node 312 under which the message 12 is to be evaluated if the LANGUAGE instance determines that the message 12 is in English. The GERMAN instance corresponds to a branch node 312 under which the message 12 is to be evaluated if the LANGUAGE instance determines that the message 12 is in German. Each of the ENGLISH and GERMAN instances are associated with a respective rule set 435 and with an English dictionary 437 and a German dictionary 437 respectively.

The purpose of the respective rule sets 435 associated with the ENGLISH and GERMAN instances is the same, namely to establish whether a message 12 relates to the retail banking division or the business banking division of the respective sub-organization. However, the individual rules within each rule set 435 are likely to be different as they may depend on, for example, the language, culture and local practice of the respective sub-organisations i.e. a rule set generated from a batch of sample messages received by a German sub-organization and submitted by German customers will not be the same as a rule set generated from a batch of sample messages received by a U.S. sub-organization and submitted by U.S. customers.

At this point, an advantage of a hierarchical rule structure in which more than one rule set exists becomes readily apparent—the U.S. organization can create, maintain and amend its own rule set 435 for distinguishing between retail-related and business-related messages 12 without compromising the equivalent rule set 435 held by the German sub-organization, and vice versa.

A further advantage is also apparent in that the benefits of lexical analysis, or word-stemming, are not lost to either the U.S. or German sub-organization since all messages 12 are analyzed by a text analyzer 436 which is associated with a dictionary in the same language as the message 12 itself.

A further four instances of text analyzer 436 are designated ENGLISH RETAIL, ENGLISH BUSINESS, GERMAN RETAIL and GERMAN BUSINESS respectively, each being associated with a respective set of rules 435 and an English or German dictionary 437, as appropriate. The ENGLISH RETAIL instance corresponds to a branch node 312 under which the message 12 is to be evaluated if the ENGLISH instance determines that the message 12 relates to the retail banking division. The ENGLISH BUSINESS instance corresponds to a branch node 312 under which the message 12 is to be evaluated if the ENGLISH instance determines that the message 12 relates to the business banking division. The GERMAN RETAIL instance corresponds to a branch node 312 under which the message 12 is to be evaluated if the GERMAN instance determines that the message 12 relates to the retail banking division. The GERMAN BUSINESS instance corresponds to a branch node 312 under which the message 12 is to be evaluated if the GERMAN instance determines that the message 12 relates to the business banking division.

In this example, it is assumed that these latter four instances correspond to the final branch nodes in the hierarchical rule structure being implemented and that their purpose, therefore, is to determine into which category, or categories, to classify a message 12. Example possible categories include "balance enquiry", "request for fund transfer", "interest rate enquiry" and so on. The respective list of categories for the U.S. retail banking division may, or may not, be identical to those of the German retail banking division, but there are likely to be at least a few categories in common. Similar comments apply in relation to the respective business banking divisions. The advantage of the hierarchical rule structure can again be appreciated since each division of each sub-organization can administer its own rule set 435 in isolation from the other rule sets and therefore without interfering with the other rule sets. Such interference would be unavoidable if a conventional flat rule structure was employed since each sub-organization/division would inevitably generate conflicting rules for identifying the category, or categories, they have in common.

It will further be apparent that the hierarchical rule structure of the invention significantly reduces the number of rule evaluations which any given message 12 must undergo. For example, in FIG. 4, a message 12 which relates to the retail banking division of the U.S. sub-organization does not have to be subjected to any of the rules which are particular to the German sub-organization or to the U.S. business banking division. This represents a significant saving in the time taken to process messages 12 and reduces the processing power required by the organization.

The invention is described above in the context of a simple banking organization. It will be appreciated, however, that the invention is equally suitable for application other fields.

Also, the invention is described herein in the context of processing electronic messages (such as emails) asynchronously but it will be appreciated that the invention is also suitable for processing electronic messages synchronously or real-time.

The invention is not limited to the embodiments described herein which may be modified or varied without departing from the scope of the invention.

The invention claimed is:

1. An electronic message processing system arranged to receive electronic messages, the system comprising:
means for storing a plurality of classification rules;
at least one text analyzer;
a respective rule engine associated with the at least one text analyzer and with the rule storage means,
the at least one text analyzer and associated rule engine being co-operable to apply at least one classification rule to the content of a received electronic message and to generate at least one result based on the application of said at least one classification rule;
a classification module co-operable with the at least one text analyzer and associated rule engine and arranged to classify the electronic message into at least one message category based on said at least one result,
wherein the classification rules are arranged into a plurality of rule sets, said rule sets being associated with one another in accordance with a hierarchical structure, the classification module being arranged to cause the at least one text analyzer in association with the associated rule engine to apply at least one of said rule sets to the message content in accordance with said hierarchical structure wherein the at least one result generated by application of a rule set from said plurality of rule sets to the message content determines at least one other rule set from said plurality of rule sets next to be applied to said message content.

2. An electronic message processing system as claimed in claim 1, wherein the at least one text analyzer and associated rule engine are arranged to generate a respective result set for the at least one rule set applied to the message content, the classification module being arranged to determine respectively from the at least one result of the at least one rule set whether to classify the message in a category or to cause a further rule set to be applied to the message content.

3. An electronic message processing system as claimed in claim 1, wherein the a text analyzer includes the rule engine.

4. An electronic message processing system as claimed in claim 3, wherein the classification module is arranged to instantiate a respective instance of the text analyzer for each rule set, each text analyzer instance being arranged to apply its respective rule set to the message content.

5. An electronic message processing system as claimed in claim 4, wherein each text analyzer instance is associated with a respective lexical analysis tool.

6. An electronic message processing system as claimed in claim 5, wherein the lexical analysis tool includes a dictionary.

7. An electronic message processing system as claimed in claim 1, wherein the rule storage means comprises a plurality of rule files, each rule file containing a respective rule set.

8. In an electronic message processing system arranged to receive electronic messages, the system comprising means for storing a plurality of classification rules; at least one text analyzer; a respective rule engine associated the at least one text analyzer and with the rule storage means, the at least one text analyzer and associated rule engine being co-operable to apply at least one classification rule to the content of a received electronic message and to generate at least one result based on the application of said at least one classification rule; and a classification module co-operable with the at least one text analyzer and associated rule engine and arranged to classify the electronic message into at least one message category based on said at least one result, a method of classifying an electronic message comprising:

arranging the classification rules into a plurality of rule sets, said rule sets being associated with one another in accordance with a hierarchical structure;

causing the at least one text analyzer, in association with the associated rule engine, to apply at least one of said rule sets to the message content in accordance with said hierarchical structure; and determining at least one other rule set from said plurality of rule sets next to be applied to said message content depending on the at least one result generated by application of the preceding rule set from said plurality of rule sets to the message content.

9. A method of classifying an electronic message as claimed in claim 8, further including:

instantiating a respective instance of the text analyzer for each rule set; and arranging each text analyzer instance to apply its respective rule set to the message content.

10. An electronic message processing system as claimed in claim 1, wherein the electronic messages to be processed include unstructured text-based messages.

11. An electronic mail (e-mail) processing system comprising an electronic message processing system as claimed in claim 1.

12. An SMS message processing system comprising an electronic message processing system as claimed in claim 1.

13. An electronic message processing system arranged to receive electronic messages, the system comprising:

means for storing a plurality of classification rules;

a classification module arranged to cause at least one classification rule to be applied to the content of a received electronic message to generate at least one result, wherein the classification rules are arranged into a plurality of rule sets, said rule sets being associated with one another in accordance with a hierarchical structure, the classification module being arranged to cause at least one of said rule sets to be applied to the message content in accordance with said hierarchical structure wherein the at least one result generated by application of a rule set from said plurality of rule sets to the message content determines at least one other rule set from said plurality of rule sets next to be applied to the message content.

14. In an electronic message processing system arranged to receive electronic messages, the system comprising: means for storing a plurality of classification rules;

a classification module arranged to cause at least one classification rule to be applied to the content of a received electronic message to generate at least one result, wherein the classification rules are arranged into a plurality of rule sets, said rule sets being associated with one another in accordance with a hierarchical structure, a method of classifying an electronic message comprising:

causing at least one of said rule sets to be applied to the message content in accordance with said hierarchical structure; and determining at least one other rule set from said plurality of rule sets next to be applied to the message content depending on the at least one result generated by application of the preceding rule set of said plurality of rule sets to the message content.

* * * * *

UNITED STATES PATENT AND TRADEMARK OFFICE
CERTIFICATE OF CORRECTION

PATENT NO.         : 7,603,415 B1                                    Page 1 of 1
APPLICATION NO.    : 09/640103
DATED              : October 13, 2009
INVENTOR(S)        : Patrick McErlean It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 937 days.

Signed and Sealed this

Twenty-eighth Day of September, 2010

David J. Kappos
*Director of the United States Patent and Trademark Office*